United States Patent [19]
Wheldon

[11] 3,787,009
[45] Jan. 22, 1974

[54] DIRECT SIDE FORCE CONTROL DEVICE

[75] Inventor: Wilbert G. Wheldon, Palos Verdes Peninsula, Calif.

[73] Assignee: Northrop Corporation, Los Angeles, Calif.

[22] Filed: Aug. 24, 1970

[21] Appl. No.: 66,449

[52] U.S. Cl............ 244/83 E, 244/42 DC, 244/77 E
[51] Int. Cl.............................................. B64c 13/04
[58] Field of Search.... 244/83 R, 83 C, 75 R, 76 R, 244/77 R, 77 A, 77 E, 87, 90 R, 90 A, 91, 42 R, 42 D, 110 R, 110 A, 42 DC, 113

[56] References Cited
UNITED STATES PATENTS

| | | | |
|---|---|---|---|
| 2,480,040 | 8/1949 | Mitchell | 244/87 |
| 2,868,481 | 1/1959 | Seamans et al. | 244/77 R |
| 2,612,329 | 9/1952 | Crandall et al. | 244/90 R X |
| 1,907,374 | 5/1933 | Van Atta | 244/87 |
| 2,707,602 | 5/1955 | Kauffman | 244/77 R |
| 2,958,484 | 11/1960 | Ross | 244/77 E |
| 3,373,958 | 3/1968 | Sims | 244/77 E |

Primary Examiner—Milton Buchler
Assistant Examiner—Barry L. Kelmachter
Attorney, Agent, or Firm—Willard M. Graham

[57] ABSTRACT

An airplane using the rudder and speed brakes located at the aileron position, or otherwise located at the wing tips and capable of differential operation, to provide a pure side force acting to alter the horizontal flight path of the plane, without sideslip or the need for roll movements normally associated with such maneuvers. This device is hereinafter referred to as the Side Force Control System.

8 Claims, 3 Drawing Figures

PATENTED JAN 22 1974
3,787,009
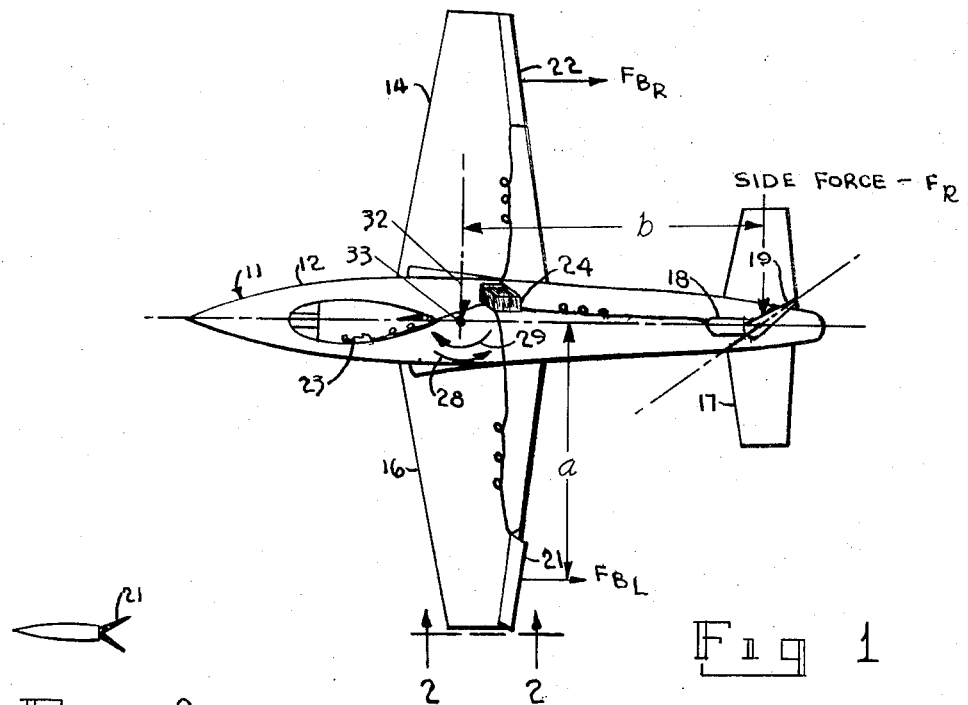
Fig 1
Fig 2
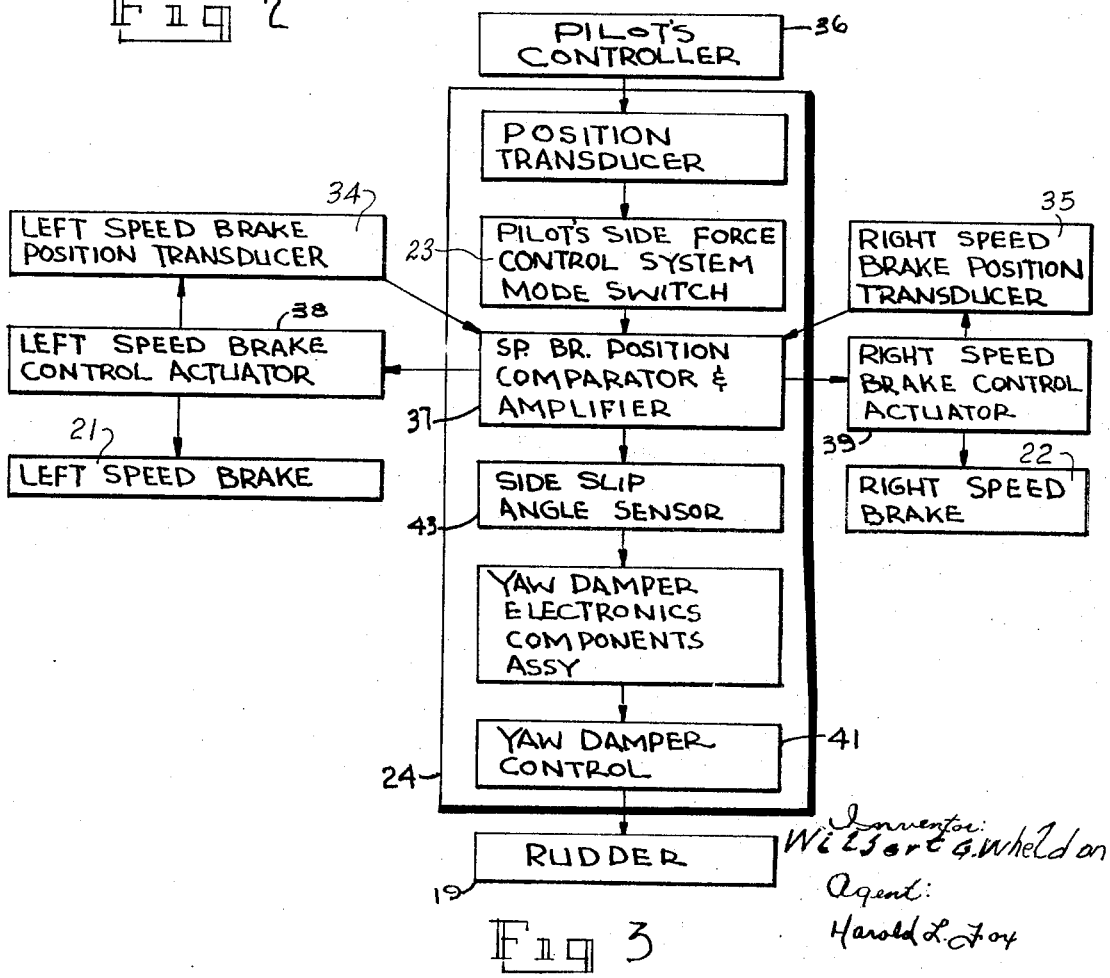
Fig 3
Inventor:
Wilbert G. Wheldon
Agent:
Harold L. Fox

DIRECT SIDE FORCE CONTROL DEVICE

The present invention relates to control surfaces for airplanes, and more particularly to military airplanes, including a rudder or like control surface cooperating with speed brakes enabling the airplane to make a flat turn thus changing its flight path without the accompanying roll normally associated with a conventional change in the flight path.

It is desirable, particularly in the control of such an aircraft, to maintain the wings-level position thereof at such time as it is effecting an azimuthal change in its flight path. This is especially important in the control of military airplanes equipped with a depressed reticle armament sight when making a dive bombing run, since this method of operation prevents the pendulous motion of the armament sight when normal bank and turn steering corrections are made. This pendulous sight motion associated with conventional aileron control of heading which degrades the pilot's ability to track accurately is according to the present invention, of heading, which problem is eliminated by the invention described herein.

According to the present invention, the airplane is equipped with a conventional rudder or like control surface, and split-type speed brakes at each wing tip which, in addition to their normal operation, are adapted to function differentially with respect to each other to produce a yaw moment which in turn is balanced by suitably positioning opposite rudder enabling the airplane to effect changes in the flight path thereof while maintaining a wings-level attitude. Yawing moments produced by the speed brakes are automatically balanced by opposite rudder deflection leaving an unbalanced side force on the airplane causing the desired radial accelerating force to produce a flat turn. This is especially useful in dive bombing runs as pointed out above since it eliminates the undesirable "pendulum-like" responses in the optical sight thereby enabling the pilot to easily align the sight with the target thus eliminating this extraneous source of error to the pilot while tracking.

Accordingly it is an object of the invention to provide an airplane incorporating control surfaces and control means whereby wings-level stability of the airplane is permitted to be maintained at such times as its flight path azimuth is altered as in a turn for example, essentially without sideslip or roll.

In the accompanying drawings:

FIG. 1 is a plan view of an airplane incorporating the control surfaces and apparatus enabling the airplane to function in the manner disclosed herein. Also shown are forces acting on the airplane at such times as its flight course is being changed in accordance with this invention to make small steering corrections while tracking a ground target.

FIG. 2 is a diagrammatic side elevational view showing the split-type speed brake of FIG. 1 as indicated by the line 2—2.

FIG. 3 is a block diagram showing a preferred form of the components comprising the rudder and speed brake interconnecting system.

Referring to the drawings, a military type airplane 11 including fuselage 12, right and left wings and tail empennage 14, 16 and 17, respectively, is shown in FIG. 1. The empennage 17 includes a vertical member 18 having a fixed relation with respect to the airplane 11 and a conventional rudder member 19. However, the members 18 and 19 may be of unitary construction referred to as an all-movable vertical tail. The airplane 11 also includes split-type speed brakes 21 and 22 of the conventional structural type described and shown in U. S. Pat. No. 2,612,329 granted Sept. 30, 1952 for example. The airplane 11 also includes an on-off mode switch 23 in a rudder-speed brake electronic interconnect 24, and a pilot's system controller 36 (FIG. 3). The controller 36 may be an independent manually operated component as shown or may be actuated by a normal control member (not shown) of the airplane 11 such as the rudder pedals. The switch 23, upon being moved to "on," causes control movements of controller 36 to act through the interconnect 24 and deflect the speed brakes 21, 22 and the rudder 19 by the novel means described below.

Referring to FIG. 3, the components comprising the rudder-speed-brake interconnect 24 are shown. Signals originated by movements of the pilot's controller indicated by the numeral 36 are transmitted to a speed-brake position comparator and amplifier 37, which signals are in turn transmitted to left and right speed brake control actuators 38 and 39, respectively. Positions assumed by the left and right speed brakes 21 and 22 are sensed by position transducers 34 and 35 and provide signals necessary to then correctly position the rudder 19 to balance the speed brakes induced yawing moment. The rudder now is producing a pure side force on the airplane which accelerating force causes the airplane to make a "flat turn." In so doing a small amount of residual sideslip may be induced which is sensed by a sideslip angle sensor 43 and corrects the signal transmitted to a yaw damper actuator indicated by the numeral 41 which in turn corrects the rudder position to null the sideslip angle.

During dive bombing runs in which stores are to be dropped, the accomplishment of directional changes without the need to intentionally roll the airplane will eliminate the pendulous effect on the armament sight (not shown). Thus tracking of a target will be rendered less difficult due to this improvement. Also target lead time needed utilizing the conventional rudder aileron bank and turn maneuver is eliminated. The flight control means disclosed herein functions in a novel manner to eliminate or minimize these objections.

Referring further to FIG. 1, it is assumed that the flight path of the airplane 11 is to be altered to the left during the course of a bombing run. To effect this change the switch 23 is first moved to its "on" position energizing the interconnect 24. The pilot will move his controller 36 in the left turn direction as far as deemed necessary for the desired rate of correction.

The left speed brake 21 first opens as shown in FIG. 2, the right one 22 remaining closed, or if already in the dive with both brakes open the same amount, the left brake 21 opens more and the right brake 22 closes correspondingly — so that net drag change is small. This gives the airplane a short-time initial left yaw which starts turning the nose heading to the left. Positions now assumed by the left and right speed brakes 21 and 22 provide signals from transducers 34 and 35 to move the trailing edge of rudder 19 to the right to balance the speed-brake-induced yawing moment, i.e., yaw moment due to speed brake induced drag $(F_{BL} - F_{BR})a$ equals yaw moment produced by the rudder $(F_R)(b)$ leaving only the unbalanced side force due to rudder $F_R$. The moments represented by arrows 28 and 29, acting about the center of gravity indicated at 33, due to rudder deflection and differential speed-brake drag, respectively, being equal and opposite, cancel each other, the linear side force $F_R$ can be transposed to the c.g. 33 of the airplane 11 leaving only the pure side force indicated by arrow 32. The side force 32 results in a change in the flight course. The sideslip sensor 43 in conjunction with yaw damper 41 causes rudder 19 to assume a position that will cancel any residual sideslip.

When the airplane 11 assumes its desired new flight path the pilot eases off on the side force controller 36 as required to maintain accurate target tracking, in a straight forward direction again.

I claim:

1. The method for executing a flat turn of an airplane equipped with conventional opposite wing-mounted split-type speed brakes and conventional rudder means, comprising applying yaw with said speed brakes followed by opposite rudder deflection.

2. The method of executing a wings-level flat turn with an airplane equipped with conventional opposite wing-mounted split-type speed brakes and conventional rudder means, which comprises producing a yaw in one direction by means of differential speed-brake deflection and then cancelling the speed-brake yaw moment by deflecting the rudder in the opposite direction while the speed brakes remain differentially deflected, thus leaving an unbalanced lateral side force on the airplane to accompany the initial speed-brake induced yaw.

3. In an airplane which includes a rudder and opposite-wing-mounted split-type speed brakes, control means operable to perform a flat turn comprising:
   a. electronic means interconnecting the control means for said rudder with the control means for said speed brakes, said speed brake control means being operable to actuate said speed brakes so that said speed brakes open and close differentially for yaw-producing moments,
   b. a manually controlled switch operable to actuate said electronic interconnecting means from an inoperable to an operable condition,
   c. a pilot's turn controller connected to said electronic interconnecting means,
   d. and side force control means in said interconnecting means responsive to said turn controller when said interconnecting means is operable to differentially operate said speed brakes in one yaw-producing direction and to deflect said rudder in the opposite yaw-producing direction,
   e. whereby the lateral side force on said airplane from said rudder deflection combined with an initial yawing motion started by said speed brakes differential operation can produce a wings-level flat turn of said airplane.

4. Apparatus in accordance with claim 3 wherein said split-type speed brakes comprise a pair of split-flap type brakes conforming to the trailing edge of each of the left and right wing portions of said airplane when said speed brakes are closed.

5. Apparatus in accordance with claim 3 wherein said differential actuation of said speed brakes includes opening of the speed brakes on only one side of said airplane if the other side speed brakes are initially closed.

6. Apparatus in accordance with claim 3 wherein said side force control means comprises
   a. a speed brake position comparator,
   b. left and right speed brake control actuators having their inputs connected respectively to said position comparator,
   c. left and right speed brake position transducers having their outputs respectively connected back to said position comparator, and
   d. means connecting the output of said position comparator to the control means for said rudder.

7. Apparatus in accordance with claim 6 wherein said rudder control means includes a sideslip angle sensor and a yaw damper.

8. Apparatus in accordance with claim 6 wherein said speed brake position comparator includes amplifier means for regulating rudder movement to an amount responsive to speed brake position to cancel the yaw moment produced by the initial differential movement of said speed brakes, thus leaving an unbalanced lateral side force on said airplane due to rudder deflection which produces a flight path direction change accompanying the initial yaw, whereby said wings-level flat turn is accomplished.

* * * * *

UNITED STATES PATENT OFFICE
CERTIFICATE OF CORRECTION

Patent No. 3,787,009          Dated January 22, 1974

Inventor(s)   Wilbert G. Wheldon

It is certified that error appears in the above-identified patent and that said Letters Patent are hereby corrected as shown below:

Column 1, lines 18 - 23. The sentence here should read -- This pendulous sight motion which degrades the pilot's ability to track accurately is caused by the banked wings associated with conventional aileron control of heading, which problem is eliminated by the invention described herein. --.

Signed and sealed this 12th day of November 1974.

(SEAL)
Attest:

McCOY M. GIBSON JR.            C. MARSHALL DANN
Attesting Officer              Commissioner of Patents